July 13, 1926.

C. A. BEETH 1,592,253

FEEDING MECHANISM FOR GLASS MOLDING MACHINES

Filed May 11, 1922 2 Sheets-Sheet 1

INVENTOR.
Clyde A. Beeth
By Davis & Simms
his ATTORNEYS.

July 13, 1926.
C. A. BEETH
FEEDING MECHANISM FOR GLASS MOLDING MACHINES
Filed May 11, 1922    2 Sheets-Sheet 2
1,592,253
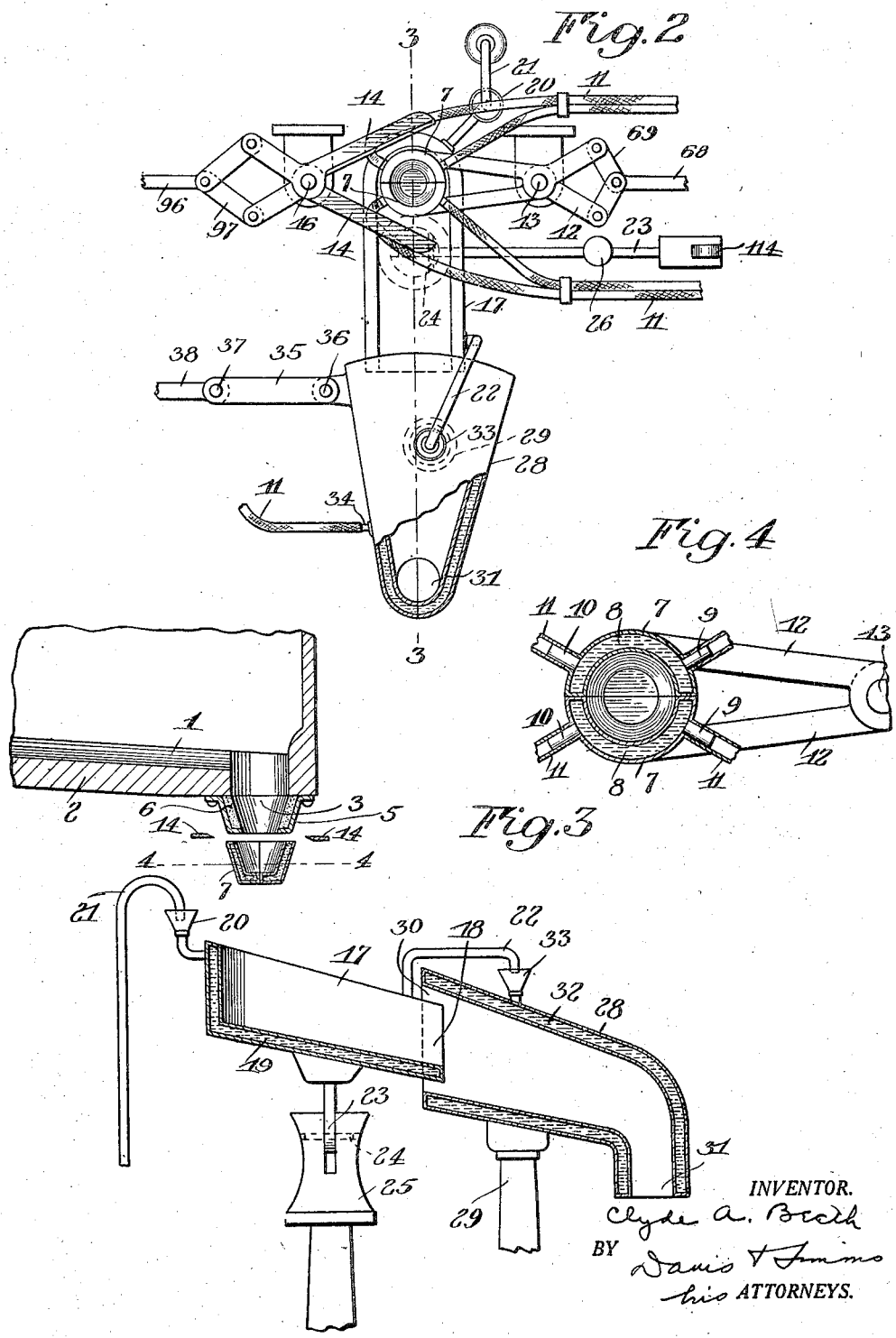
INVENTOR.
Clyde A. Beeth
BY Davis & Timms
his ATTORNEYS.

Patented July 13, 1926.

1,592,253

UNITED STATES PATENT OFFICE.

CLYDE A. BEETH, OF ROCHESTER, NEW YORK.

FEEDING MECHANISM FOR GLASS-MOLDING MACHINES.

Application filed May 11, 1922. Serial No. 560,194.

The present invention relates to feeding mechanisms for glass molding machines and an object of the invention is to provide a mechanism which will deliver into the molds of a blowing machine an amount of molten glass that will produce a container, which will be accurate in weight and will give a correct content, the container, at the same time, being free from bubbles or blisters. An object of the invention is to deliver the molten glass into the molds of the blowing machine in the proper condition to make a glass container, free from threads due to the elimination of the twisting. A further object of the invention is to increase the speed of depositing the glass in the molds after it has been cut from the main body, so that a chilling of the glass in passing to the molds does not take place. Still another object of the invention is to provide a mechanism which will reduce the cost of manufacture of glass articles, due to the facts that an increased speed is obtained over the hand method and that the mechanism enables the glass to be delivered to the molds by unskilled labor.

To these and other ends, the invention consists of certain parts and combinations of parts all of which will be hereinafter described, the novel features being pointed out in the appended claims.

In the drawings:

Fig. 2 is a detail plan view of the feeding mechanism with parts in section;

Fig. 3 is a section on the line 3—3, Fig. 2; and

Fig. 4 is an enlarged section on the line 4—4, Fig. 3.

Figure 1:
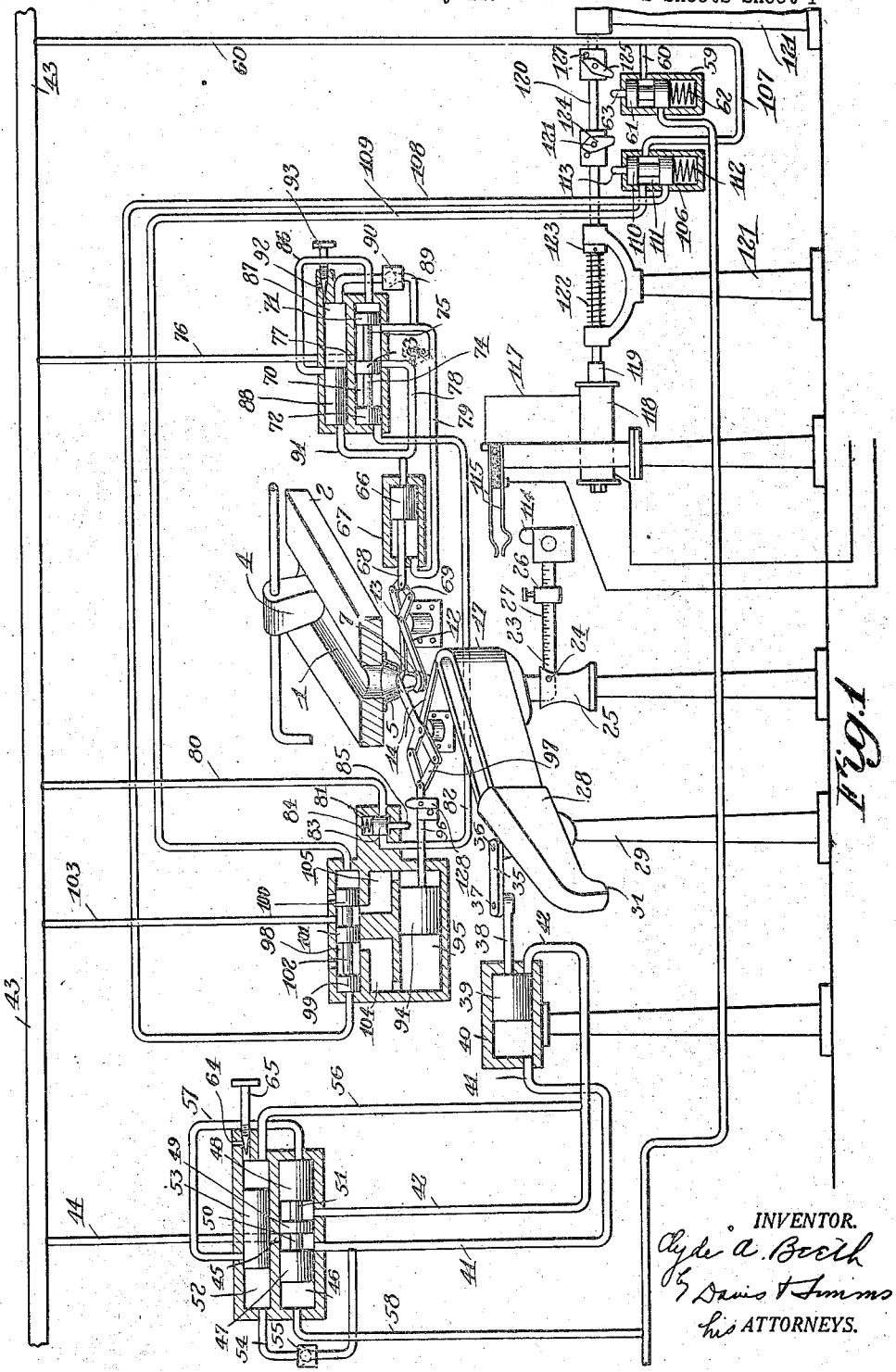
Fig. 1 is a diagrammatic view showing a feeding mechanism constructed in accordance with this invention.

The glass is contained in a furnace in the usual manner and leads from the furnace by way of a channel or groove 1 in a runway or silica block 2 to a discharge opening 3 at the end of the channel 1, the latter being formed in the block in order to confine the glass to a narrow stream. A gate 4 may be provided in the channel adjacent the receiving end thereof to cut off the flow of glass to the channel. A spout is provided at the discharge end of the channel which, in this instance, is in the form of a metallic member 5, lined with refractory material 6 and of such thickness that the heat from the glass will maintain this spout in a hot condition, so that no chilling of the glass takes place in the spout. Adjacent the spout is a valve which, in this instance, is a water cooled cup shaped construction, divided vertically to provide two members 7, each of which has a water chamber 8 with an inlet 9 and an outlet 10 to both of which the water circulating tubing 11 is connected. The valve is water cooled to prevent the glass adhering thereto. These members 7 are mounted on levers 12 which are pivoted at 13 and operated in any suitable manner, as for instance, by an air motor which will be hereinafter set forth.

Operating between the valve and the spout is a shearing or cutting mechanism which, in this instance, embodies two blades 14 pivoted upon a common axis 16 and also operated in any suitable manner, as for instance, by an air motor to be hereinafter set forth. The valve is spaced from the spout a distance to permit the shearing mechanism to operate between the spout and the valve, but this space is not sufficient to allow the glass which is in a substantially dough-like condition to pass through this space or opening.

From the valve the glass is delivered into the open top of a measuring chute or receptacle 17 which preferably has one side open at 18 through which the molten glass may flow therefrom, the glass being delivered at the opposite closed end of this receptacle or chute directly from the spout after the valve is opened. This chute may have a water cooling chamber 19 which has an inlet funnel 20 into which water is delivered through a nozzle 21. A nozzle 22 extends from said chamber 19 and discharges the water from the chamber in a manner to be hereinafter described.

The weighing receptacle or chute 17 is preferably supported on a scale beam 23 which is pivoted at 24 to a standard 25 and has a weight 26 adjustable over a scale 27 thereon. The chute 17 is of such a length that the amount of glass necessary to make a desired receptacle does not flow from the outlet 18 until the desired amount of glass has been delivered to the chute, although the glass is at all times moving toward said outlet and the chilled walls of the chute prevent the glass sticking to such walls.

From the weighing receptacle or chute the molten glass passes to a delivery spout 28 which is mounted on a standard 29 to turn about a vertical axis. This delivery spout has its inlet end 30 into which the weighing receptacle or chute projects widened horizontally, so as to permit the swinging of the delivery spout with reference to the delivery end of the weighing receptacle 17, in order that the discharge end 31 of the delivery spout 28 may be shifted with reference to the molds, so as not to interfere with the movement of the blow head of the blowing machine to and from the molds. In order that the glass will not stick to the delivery spout 28, the latter has a water cooling chamber 32 surrounding the same and this water cooling chamber has an intake funnel 33 directly over the axis of turning of the delivery spout into which the discharge nozzle 22 from the water chamber of the weighing chute discharges water. An outlet 34 leads from the chamber 32 to the water tubing 11.

Any suitable means may be employed for operating the delivery spout 30. In this instance, a link 35 is pivotally connected to the spout at 36 and is pivotally connected to the spout at 37 to an air motor embodying a pitman 38 which connects with the piston 39 operating in a cylinder 40, to which air under pressure is alternately delivered to opposite ends thereof on opposite sides of the piston 39 preferably through two pipings 41 and 42.

In order to control this flow of air to the cylinder 40, a main supply pipe 43 is provided which by a piping 44 connects through an inlet 45 with a cylinder 46 in which a controlling valve operates. The pipes 41 and 42 also connect with the cylinder 46 preferably near the center of the latter, but in spaced relation to each other. The controlling valve has, in this instance, two pressure heads 47 and 48 operating in the cylinder 46 on opposite sides of the points of connection of the pipes 41 and 42. This controlling valve also has a cylindrical controlling portion 49 arranged between the heads 47 and 48 in spaced relation to the latter and connected to the heads 47 and 48 by connecting portions 50 and 51, respectively. When the controlling portion 49 is in the position shown in Fig. 1, the main air pipe 43 will connect with the pipe 41 through the cylinder 46 by way of the passageway or space between the controlling head 49 and the piston 47. When the controlling valve is shifted to the opposite end of the cylinder 46, the controlling portion 49 will be shifted, so that the main air pipe 43 will connect with the pipe 42 by way of the passages between the pipe 44 and the pressure head 48. It is apparent that the movement of the controlling valve alternately in opposite directions effects the movement of the piston 39 alternately in opposite directions and thus produces a movement of the delivery spout 28 toward and from the blowing machine molds which are successively presented to the delivery spout.

Movement of the controlling valve for the piston 39 may be effected in any suitable manner. In this instance, a cylinder or chamber 52 is provided in which a piston 53 operates. This cylinder 52 has a piping 54 connected to one end thereof and to the pipe 41, a valve 55 being provided in such pipe 54. A pipe 56 connects the opposite ends of the cylinder or chamber 52 with a pipe 42. A pipe 57 connects the chamber 52 with the end of the chamber 46 in which the pressure head 48 operates, whereas a piping 58 connects with a valve chamber 59 which by a pipe 60 connects with the main air pipe 43. In the valve chamber 59 a plunger valve 61 operates, being normally held in closed position by a spring 62 operated in a manner to be hereinafter set forth through a stem 63 projecting from one end of the valve chamber. When this valve is depressed air passes from the piping 60 into the piping 58 causing the air to act on the pressure head 47 and shift the controlling valve for the piston 39 to the position shown in Fig. 1, thus moving the piston 39 to the position shown in Fig. 1. At the same time air passes by way of the piping 54 to the valve 52, thus shifting the cylinder valve member 53 toward the opposite end of the chamber 52, so that air through the port 45 may enter the chamber 52 and pass by way of the piping 57 to the end of the chamber 46 in which the pressure head 48 operates, thus causing the controlling valve for the piston 39 to be shifted to the opposite end of the chamber 46. This connects the pipe 42 with the main air piping 43 through the pipe 44. With the shifting of the piston or plunger 39 by air from the pipe 42, air passes from the pipe 42 to the chamber 52 by way of the piping 56 and causes the valve plunger 53 to shift toward the end of the chamber 52 opposite the end with which the pipe 56 connects, in which position the plunger 53 remains until the valve plunger 61 is against actuated.

In order to control the speed of operation of the devices for shifting the delivery spout 28, the chamber 52 is provided at the end adjacent the connection with the pipe 56 with an exhaust port 64 the size of which is controlled through a needle valve 65. It is apparent the larger this opening, the greater will be the speed of operation of the valve member 53 and the greater will be the speed of operation of the piston 39.

For operating the valve member 7, an air motor may be employed, comprising a piston 66 operating in a cylinder 67 and connected by a rod 68 with a toggle 69 which in turn is connected to the ends of the lever 12. This piston 66 is operated by a controlling mechanism comprising preferably the cylinder or chamber 70 in which a controlling member operates. This controlling member has a pressure head 71 and a pressure head 72 with a cylindrical controlling member 73 between them connected to said pressure members by stems 74 and 75. A pipe 76 connects with the main air pipe 43 with a port 77 to deliver air to the chamber 70. Two pipes 78 and 79 lead from the chamber 70 to the opposite ends of the cylinder or chamber 67, so that air may be alternately delivered from the chamber 70 to the chamber 67, this being effected through the movement of the controlling portion 73 of the controlling member. This controlling portion, in one position, connects the pipe 78 with the pipe 76, and, in the other position, connects the pipe 79 with the pipe 76. Movement of the controlling member in one direction may be effected by admitting air adjacent to the pressure head 72 preferably by a piping 80 connecting with a valve member 81 and a pipe 82 leading from said valve chamber to the chamber 70 at the end adjacent the pressure head 72. A valve 83 operates in the valve chamber 81 and is moved in one direction to close the passageway by means of a spring 84, this valve member having a head or stem 85 which is actuated in the manner to be hereinafter set forth. Movement of the controlling member in the valve chamber 70 in the other direction may be effected by air passing through a pipe 86 and connecting with the chamber or cylinder 87 in which a controlling plunger or member operates. This controlling plunger or member, when in one position, closes the pipe 86 and, in the other position, opens said pipe to the port 77, so that air may be passed from the pipe 76 into the pipe 86 and then to the chamber or cylinder 70 adjacent the pressure member 71. Movement of the valve member 88 to close the pipe 86 may be effected through a pipe 89 which has a valve 90 therein, this pipe 89 connecting with the pipe 79 and with the end of the cylinder 87. Movement of the valve member 88 in the opposite direction may be effected through a pipe 91 connecting with the pipe 78 and with the opposite end of the cylinder or chamber 87. It is apparent that when the valve member 83 is actuated, air passes to the chamber 70 to move the controlling member to the right. This admits the air from the pipe 76 to the pipe 78 to move the piston 66 to the left. At the same time the air is admitted to the pipe 91 to move the controlling member 88 to the right, so as to establish connection between the pipe 76 and the pipe 86, thus admitting air to the pressure member 71 and causing the controlling member to move to the left, as illustrated in Fig. 1. This establishes communication between the pipe 76 and the pipe 79 so that the plunger 66 will be moved to the right. The speed of movement of the valve member 88 may be varied by changing the effective area of the escape opening 92 through the means of a needle valve 93.

The operation of the shearing mechanism is effected in this embodiment by an air motor in the form of a piston 94 operating in a cylinder or chamber 95 and connected by a pitman 96 to a toggle 97 connecting the ends of the cutting blades or shears 14. The movement of this pitman is controlled by a controlling member operating in a chamber or cylinder 98 and having a pressure head 99 and a pressure head 100, a controlling portion 101 being provided between these two heads and being connected to such heads in spaced relation thereto by stems 102. The chamber 98 connects with the main air supply 43 through a pipe 103 and the chamber 95 connects with the chamber 98 through two passageways or ports 104 and 105. When the controlling member 101 is in one position, it permits air to pass by way of the pipe 103 and the port or passageway 105 to the chamber 95 on one side of the piston 94 and, when the portion 101 is in its other position, it permits air to pass by way of pipe 103 and passage 104 to the cylinder 95 on the opposite side of the piston 94, thus effecting the movement of the piston in the opposite direction. In order to control the movement of the controlling lever for the piston 94, air is led to a valve casing 106 by way of the pipe 107 connecting with the pipe 60. Also leading from the valve casing are two pipes 108 and 109 connecting with the chamber 98 at opposite ends thereof. In the valve casing 106, a valve plunger 110 operates, this plunger having an annular passageway 111 therein which, in the uppermost position of the valve member 110 maintained by the spring 112, connects the pipe 107 with pipe 109, so that air is passed to the right hand side of the chamber 98, whereas, when the valve member 110 is depressed through its stem 113 as in the manner to be described, the annular passage 111 will connect the pipe 107 to the pipe 108 and return air to the left hand side of the chamber 98, so that the valve 110 effects the movement of the controlling member in the chamber 98 and the latter effects the movement of the plunger 94.

The control of the shearing mechanism for the molten glass and the valve controlling the glass, as well as the shifting of the spout 28 may be all automatically controlled from the weighing mechanism and to this end the outer end of the weighing mechanism has a portion 114 which is adapted to control an electrical circuit preferably by bringing two contacts 115 into engagement with each other when the weighing mechanism is operated upon the depositing of a desired amount of glass in the weighing chute or receptacle 17. These contacts 115 control a circuit 117 (a portion only of which is illustrated) in which a solenoid 118 is arranged. The core 119 of this solenoid has an axially movable rod 120 connected thereto, this rod being guided in standards 121 and being moved in a direction opposite that in which it is moved by the solenoid core by a spring 122 surrounding the rod and abutting a collar 123 thereon.

The rod 120 controls the valve members 61 and 110. To this end the valve member carries two detents 124 and 125 pivoted, respectively, at 126 and 127 on the rod 120. When the rod 120 is moved under the action of the solenoid, the detent 124 will cooperate with the operating portion 113 of the valve member 110 and depress such valve member, while the detent 125 will ride over the operating projection 63 and the valve member 61, and when the operating rod 120 is moved in the opposite direction under the action of the spring 122, the detent 124 will ride over the projection 113 and the valve member 110, whereas the detent 125 will cooperate with the operating projection 63 and depress said valve member against the action of the spring. It is apparent that these depressions of the two valve members 61 and 110 are each only for a short movement. It follows that the operating mechanism for the shearing means is operated almost immediately with the lowering of the chute or receptacle of the weighing mechanism, moving the piston 94 to the right and immediately thereafter effecting the movement of the piston 94 to the left. The next mechanism which operates is that for the valve of the spout connected with the furnace, this valve being closed almost immediately upon the shearing of the molten glass passing from the spout.

The operation of the valve mechanism for the furnace spout is effected through the valve member 33 which is connected by a detent 128 pivoted to the pitman 96 in such a manner that, when the pitman moves to the right, the valve member 83 is not actuated, but, when the pitman 96 moves to the left (Fig. 1), the detent will engage the operating projection 85 on the operating valve 83 and establish connection between the air pipe 43 and the operating means for the valve. This operating mechanism then proceeds to close the valve and thereafter to open the same, the duration of time of closing being determined by the adjustment of the needle valve 93. Before the valve for the glass supply is opened, the rod 120 returns under the action of the spring 122 and effects the operation of the valve member 61, so that air from the pipe 43 is admitted to the operating mechanism for the delivery spout 28, shifting said spout relatively to the weighing chute or receptacle 17, so as to present the delivery end 31 over the mold in receiving position. This operation of the delivery spout 28 occurs in time sufficient to permit the material which is flowing from the weighing chute 17 to enter the mold. Immediately thereafter, the delivery spout 28 is moved to its original position out of the path of the blow head of the blowing machine, this result being effected through the operating mechanism for the delivery spout.

The operation of the invention will be understood from the foregoing description, but it may be summarized as follows: Molten glass is delivered from the furnace to the channel 1 and passes through the spout at the end of the channel provided the valve members 7 are separated, into the weighing chute or receptacle 17. Before this glass passes from the delivery end of the chute and after the desired amount has been accumulated in the chute, the flow of glass from the furnace is stopped, the cutting shears first operating to sever the flowing glass and the valve member 7 almost immediately thereafter closing to complete the stoppage of the flow, the shears then moving to open position. The glass which has been deposited in the weighing receptacle or chute 17 flows into and through the delivery spout 28, the latter having been shifted, so that the glass issuing therefrom will be deposited in a mold of the blowing machine. Thereafter the delivery spout moves away from the mold and out of the path of the blow head of the blowing machine and a new supply of glass is fed to the weighing chute or receptacle 17 through the separation of the valve members 7, these operations being continued until it is desired to stop the apparatus.

From the foregoing it will be seen that there has been provided a feeding mechanism which will deliver molten glass into the molds of a blowing machine in a condition to make glass containers free from glass bubbles and blisters and free also from all threads due to the elimination of twisting. The glass is deposited rapidly into the mold, after having been cut from the main body so that it does not have time to chill in its passage from the main body to the mold. The amount of glass fed to each mold is constant, so that it is possible to obtain a container which will have an accurate content. The invention reduces the cost of manufacturing glass articles, as this machine has an increased capacity over the hand method now in use and does not require skilled labor to operate it.

What I claim as my invention and desire to secure by Letters Patent is:

1. A feeding mechanism for glass molding machines comprising a movably mounted spout for delivering molten glass into the mold of a blowing machine, a weighing mechanism for delivering glass to the spout, and mechanism for controlling the movement of the spout controlled by said weighing mechanism.

2. A feeding mechanism for glass molding machines comprising a spout rotatable about an upright axis to move the discharge end of the spout toward and from the molding machine, a weighing mechanism for delivering molten glass to said spout, and mechanism controlled by said weighing mechanism for effecting the movement of the spout about its axis.

3. A feeding mechanism for glass molding machines comprising a movably mounted spout, weighing mechanism for delivering molten glass to the spout, a motor for moving said spout relatively to said weighing mechanism, and electrical means controlled by the weighing mechanism and controlling said motor.

4. A feeding mechanism for glass molding machines comprising a movably mounted spout, a weighing mechanism for delivering molten glass into the spout, an air motor for effecting the movement of the spout relatively to the weighing mechanism, a valve for controlling said air motor, and electrical means controlled by the weighing mechanism and having a solenoid controlling said valve.

5. In a feeding mechanism for glass molding machines, the combination of a spout mounted to turn about an upright axis and having its receiving end widened horizontally, with a weighing mechanism having a chute extending into said receiving end of the spout, and mechanism for turning said spout relatively to said chute of the weighing mechanism.

6. In a feeding mechanism for glass molding machines, the combination with a spout through which the glass is delivered into the molds, of a weighing mechanism discharging into said spout, and mechanism controlled by the weighing mechanism for effecting the movement of the spout toward and from operative relation with the molds.

7. In combination with a discharge spout of a glass furnace, a divided cup shaped valve operating below said spout, and a weighing mechanism having a trough into which the divided valve discharges the molten glass.

8. In combination with a discharge spout of a glass furnace, a divided cup shaped valve operating below said spout, a weighing mechanism having a trough into which the divided valve discharges the molten glass, and mechanism controlled by said weighing trough for effecting the operation of the divided cup shaped valve.

9. In combination with a discharge spout of a glass furnace, a divided cup shaped valve operating below said spout, a shearing mechanism operating between said valve and said spout, and a weighing mechanism receiving the molten glass from the spout and automatically controlling said valve and said shearing mechanism.

10. In combination with a discharge spout of a glass furnace, a spout arranged to discharge molten glass into the molds and a weighing mechanism interposed between the discharge spout of the glass furnace and the last mentioned spout and having provision for weighing the glass received from the spout of the glass furnace and for discharging it into the mold delivery spout, while the molten glass is in motion.

11. In combination with a discharge spout of a glass furnace, a weighing mechanism having a receptacle in the form of a chute with an inclined bottom and adapted to receive the molten glass from the spout.

12. In combination with a discharge spout of a glass furnace, a weighing mechanism having a receptacle in the form of a chute with an inclined botttom and adapted to receive the molten glass from the spout, and a spout receiving the molten glass from the receptacle of the weighing mechanism and delivering such glass to the mold.

13. In combination with a discharge spout of a glass furnace, a weighing mechanism having a water cooled chute receiving the molten glass from the discharge spout, and a spout receiving the molten glass from the chute of the weighing mechanism and delivering such glass to the mold.

14. In combination with a discharge spout of a glass furnace, a weighing mechanism receiving molten glass from said discharge spout, a valve interposed between said discharge spout and the weighing mechanism, a delivery spout receiving the molten metal from the weighing mechanism a motor for moving the delivery spout, a motor for moving the valve, and a controlling means for the two motors controlled by the weighing mechanism.

15. In combination with a discharge spout of a glass furnace, a weighing mechanism receiving molten glass from said spout, a delivery spout receiving the molten glass from the weighing mechanism and movable relatively to the weighing mechanism, a motor for effecting the movement of the delivery spout, a motor for effecting the movement of the shearing mechanism, and a common controlling means for the two motors controlled by the weighing mechanism.

16. In combination with a discharge spout for a glass furnace, a weighing mechanism receiving molten glass from the discharge spout, a delivery spout receiving molten glass from the weighing mechanism, a valve for controlling the flow of glass to the weighing mechanism from the discharge spout, a shearing mechanism for shearing the glass passing to the weighing mechanism from the discharge spout, a motor for effecting the movement of the delivery spout, a motor for effecting the movement of the valve, a motor for effecting the movement of the shearing mechanism, and a common controlling means for the three motors controlled by the weighing mechanism.

17. In combination with a discharge spout of a glass furnace, a weighing mechanism having a chute receiving molten glass from the discharge spout, a delivery spout movable relatively to the weighing mechanism and receiving the molten glass from the chute and the weighing mechanism, a shearing mechanism operating between the discharge spout of the glass furnace and the chute of the weighing mechanism, a motor for moving the delivery spout, a motor for moving the shearing mechanism, and means controlled by said weighing mechanism for effecting the operation of the motor of the delivery spout and the operation of the shearing mechanism.

18. In combination with a discharge spout of a glass furnace, a weighing mechanism having a chute receiving the molten glass from the discharge spout, a movably mounted delivery spout receiving the molten glass from the chute of the weighing machine, an air motor for operating the delivery spout, a shearing mechanism operating between the discharge spout of the glass furnace and the chute of the weighing mechanism, an air motor for operating the shearing mechanism, two valves, one controlling the air motor for the delivery spout and the other controlling the air motor for the shearing mechanism, a solenoid energized through the weighing mechanism and having a core, a rod connected to the core of the solenoid to be moved in one direction thereby, a spring moving said rod in the opposite direction, two detents, one effecting the operation of the valve controlling the shearing mechanism when the solenoid is energized and the other cooperating with the valve controlling the motor of the delivery spout when the solenoid is deenergized.

19. In combination with a discharge spout of a glass furnace, a weighing mechanism having a chute receiving the molten glass from the discharge spout, a movably mounted delivery spout receiving the molten glass from the chute of the weighing machine, an air motor for operating the delivery spout, a shearing mechanism operating between the discharge spout of the glass furnace and the chute of the weighing mechanism, an air motor for operating the shearing mechanism, two valves, one controlling the air motor for the delivery spout and the other controlling the air motor for the shearing mechanism, a solenoid energized through the weighing mechanism and having a core, a rod connected to the core of the solenoid to be moved in one direction thereby, a spring moving said rod in the opposite direction, two detents, one effecting the operation of the valve controlling the shearing mechanism when the solenoid is energized and the other co-operating with the valve controlling the motor of the delivery spout when the solenoid is deenergized, a valve for controlling the flow of molten glass from the discharge spout of the glass furnace to the chute of the weighing mechanism, an air motor for controlling said valve, a valve for controlling said air motor, and means operated from a motor of the shearing mechanism to operate the controlling valve of the motor of the glass valve when the shearing mechanism has effected the shearing of the molten glass passing to the chute of the weighing mechanism.

CLYDE A. BEETH.